(12) United States Patent
Farid et al.

(10) Patent No.: US 9,375,858 B2
(45) Date of Patent: Jun. 28, 2016

(54) METHOD AND DEVICE FOR REMOVING RINDS FROM A FOOD ITEM

(75) Inventors: Tariq Farid, North Haven, CT (US); Kamran Farid, Cheshire, CT (US); Amit Doshi, North Wales, PA (US)

(73) Assignee: Edible Arrangements, LLC, Wallingford, CT (US)

( * ) Notice: Subject to any disclaimer, the term of this patent is extended or adjusted under 35 U.S.C. 154(b) by 1096 days.

(21) Appl. No.: 12/507,257

(22) Filed: Jul. 22, 2009

(65) Prior Publication Data

US 2010/0031831 A1   Feb. 11, 2010

Related U.S. Application Data

(60) Provisional application No. 61/086,615, filed on Aug. 6, 2008.

(51) Int. Cl.
| | |
|---|---|
| *A23N 7/08* | (2006.01) |
| *A47J 17/00* | (2006.01) |
| *B26D 3/28* | (2006.01) |
| *A23N 7/00* | (2006.01) |
| *B26D 7/06* | (2006.01) |
| *A23N 4/06* | (2006.01) |
| *A23N 4/14* | (2006.01) |
| *B26D 1/00* | (2006.01) |

(52) U.S. Cl.
CPC .. *B26D 3/28* (2013.01); *A23N 7/00* (2013.01); *B26D 3/283* (2013.01); *B26D 7/0608* (2013.01); *A23N 4/06* (2013.01); *A23N 4/14* (2013.01); *B26D 1/0006* (2013.01); *B26D 7/0641* (2013.01); *Y10T 83/04* (2015.04)

(58) Field of Classification Search
CPC .......... A23N 4/14; A23N 7/00; A23N 7/026; A23N 4/06; A47J 17/02; A47J 17/16; B26D 5/00; A01F 11/06
USPC .......... 99/541, 588, 590, 594, 596, 598, 539, 99/540, 567; 83/13
See application file for complete search history.

(56) References Cited

U.S. PATENT DOCUMENTS

| | | | | |
|---|---|---|---|---|
| 3,610,303 | A * | 10/1971 | Loveland et al. | 99/542 |
| 4,350,088 | A * | 9/1982 | Rubio, Jr. | 99/538 |
| 4,355,572 | A * | 10/1982 | Silvestrini | 99/516 |
| 4,437,398 | A * | 3/1984 | Savi | 99/587 |
| 4,446,782 | A * | 5/1984 | Black | 99/589 |
| 4,472,444 | A * | 9/1984 | Studer et al. | 426/484 |
| 4,679,499 | A * | 7/1987 | Gutierrez-Rubio | 99/591 |
| 4,738,195 | A * | 4/1988 | Berube et al. | 99/591 |
| 4,765,234 | A * | 8/1988 | Cailliot | 99/593 |
| 5,105,735 | A * | 4/1992 | Gonzalvo | 99/590 |
| 5,133,250 | A * | 7/1992 | Del Ser Gonzalez | 99/491 |
| 5,231,921 | A * | 8/1993 | Kirk | 99/537 |
| 5,558,011 | A * | 9/1996 | Heim | 99/595 |
| 5,664,490 | A * | 9/1997 | Tompkins et al. | 99/541 |
| 6,116,155 | A * | 9/2000 | Harding | 99/541 |
| 6,591,742 | B1 * | 7/2003 | Leonor | 99/589 |
| 7,077,058 | B2 * | 7/2006 | Muro | 99/541 |
| 2004/0069160 | A1 * | 4/2004 | Kuan | 99/537 |

* cited by examiner

*Primary Examiner* — Dana Ross
*Assistant Examiner* — Hemant Mathew
(74) *Attorney, Agent, or Firm* — DLA Piper LLP (US)

(57) ABSTRACT

An apparatus for removing a rind from a food item, the apparatus comprising: a compartment defining an interior area adapted to contain a food item, the compartment having at least one opening and a blade assembly; a pushing apparatus, wherein at least a portion of the pushing apparatus is movable to engage the food item; actuator means for driving the pushing apparatus to contact at least a portion of said food item in the compartment.

3 Claims, 6 Drawing Sheets

METHOD AND DEVICE FOR REMOVING RINDS FROM A FOOD ITEM

CROSS REFERENCE TO RELATED APPLICATION

This application claims priority from provisional application Ser. No. 61/086,615, filed Aug. 6, 2008, the disclosure of which is incorporated by reference herein, in its entirety.

FIELD OF THE INVENTION

The present invention is generally directed to an apparatus for removing rinds from food items, such as fruit or like food products, for example, a melon.

BACKGROUND

It is well known that a rind, peel or an upper layer of skin (hereinafter referred to collectively as "rinds") of fruit can be removed by a knife. Utilization of knives to remove a rind from large fruit or numerous pieces of fruit can be time consuming, physically exhausting and dangerous. Previous attempts to overcome these downfalls have resulted in devices that are large, cumbersome, and often not easily portable. Furthermore, operating the devices is often still physically exhausting and dangerous.

Accordingly, the inventors recognize that a need exists for an improved apparatus and method for removing rinds.

SUMMARY

According to aspects illustrated herein, there is provided an apparatus for removing a rind of a food item, the apparatus comprising: a compartment defining an interior area adapted to receive the food item, the compartment having at least one opening; a blade assembly disposed in proximity to the at least one opening of the compartment; a pushing apparatus, wherein at least a portion of the pushing apparatus is movable to engage the food item; an actuator for driving the pushing apparatus to contact at least a portion of the food item in the compartment and to move the food item from the interior area into contact with the blade assembly such that at least a rind of the food item is removed by the blade assembly.

According to another aspect illustrated herein, there is provided a method for removing a rind from a food item, the method comprising: positioning a food item in a compartment of an apparatus, the compartment defining an interior area adapted to receive the food item, having at least one opening; actuating a pushing apparatus, to move the food item out of the interior area into contact with a blade assembly and continuing activation of the pushing apparatus such that the blade assembly removes the rind from the food item.

According to another aspect illustrated herein, there is provided an apparatus for removing a rind from a food item, the apparatus comprising: a frame having a base and a support wall, wherein the support wall is attached to the base; a compartment for holding a food item, the compartment having at least one opening and a blade assembly, wherein the compartment is mounted on the support wall; a first surface adjacent to the opening of the compartment, wherein the first surface is adapted to receive at least a portion of the food item; a second surface positioned beneath the compartment, wherein the second surface is adapted to receive a at least a portion of the food item; and a pushing apparatus and a hand crank, wherein the pushing apparatus is in rotatable cooperation with the hand crank, wherein the pushing apparatus and the hand crank are rotatable about an axis of rotation, wherein the pushing apparatus is positioned above an interior area of the compartment, further wherein upon rotation of the hand crank, at least a portion of the pushing apparatus is rotated whereby at least a portion of the pushing apparatus contacts at least a portion of the food item in the compartment.

The above described and other features are exemplified by the following figures and detailed description.

DETAILED DESCRIPTION

Figure 1:
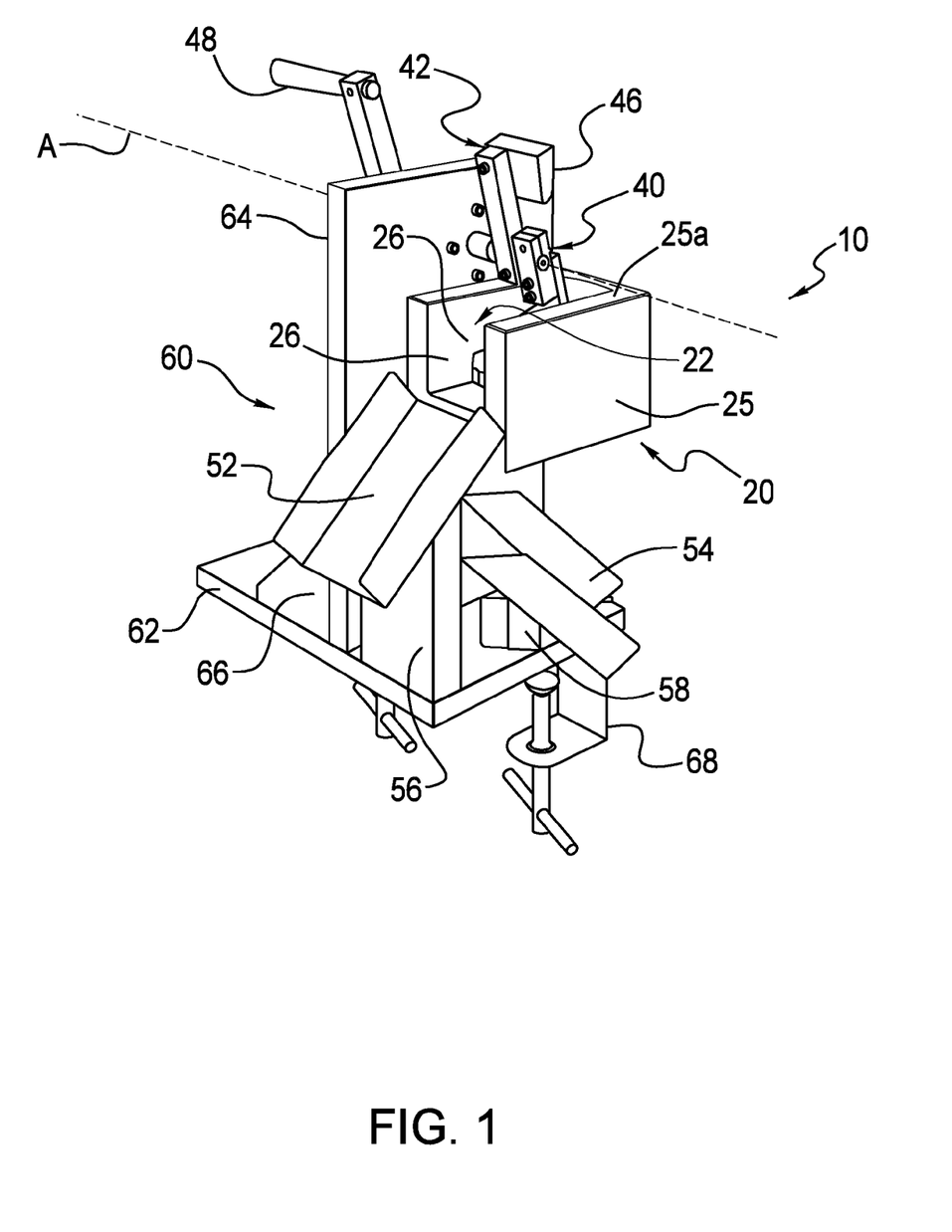
FIG. 1 is a perspective view of an apparatus for removing rinds from a food item.
Figure 2:
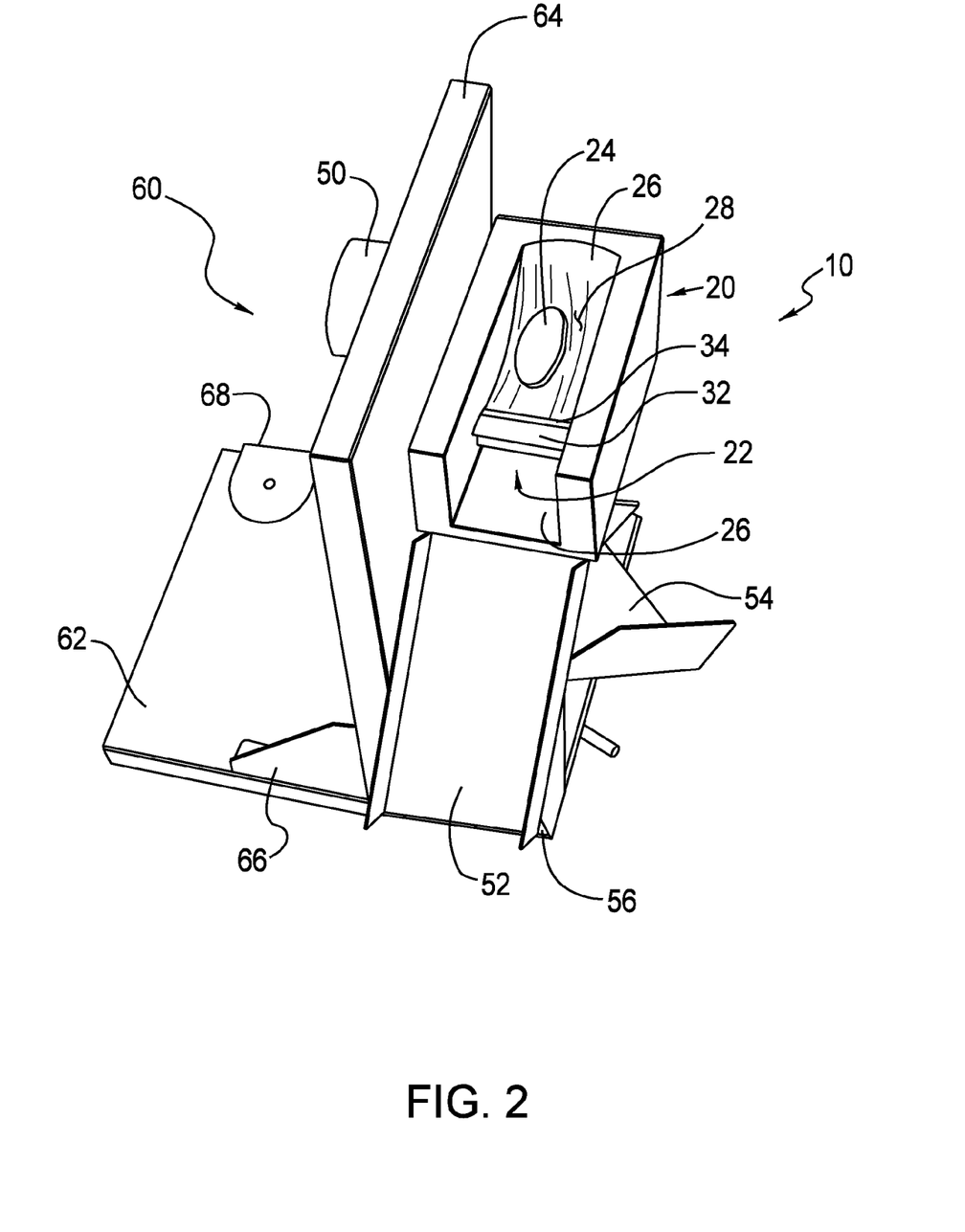
FIG. 2 is a perspective view of a portion of the apparatus of FIG. 1.

FIGS. 1 and 2 illustrate one embodiment of an apparatus 10 for removing rinds from a food item 24, such as a fruit or like food product. The food item 24 can be any piece of food with a rind that is desired to be removed. Examples of the food item 24 include fruit, such as a melons including honey dew melons and cantaloupe, however it is contemplated the food item can be other items such as an apple, potato, turnip, rutabaga, kiwi, banana, orange, lemon, lime, and the like. Alternatively, food item 24 may be a portion of any of the foods listed above, i.e., a slice of melon, a slice of apple, and the like.

Figure 3:
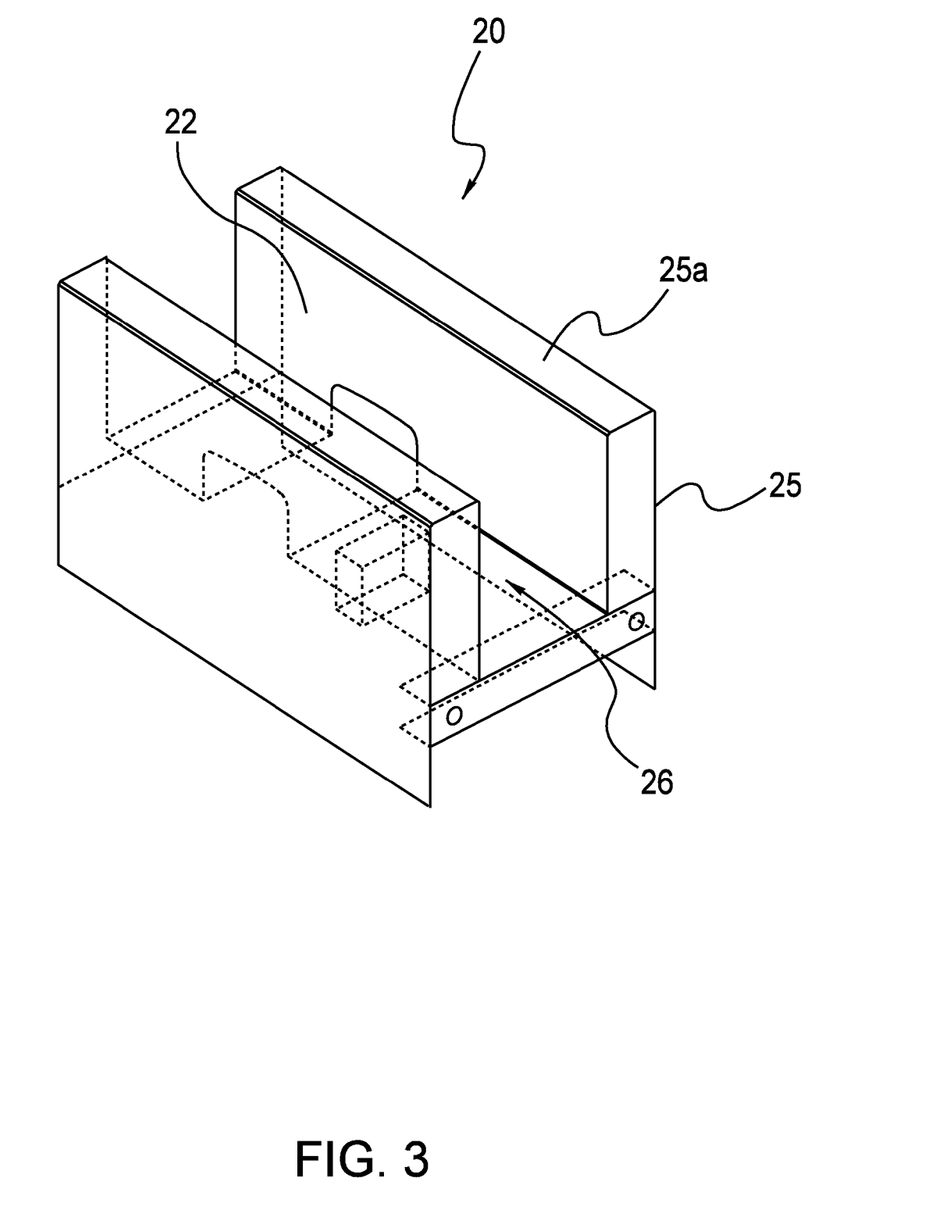
FIG. 3 illustrates a perspective view of a compartment of the apparatus of FIG. 1.
Figure 5:
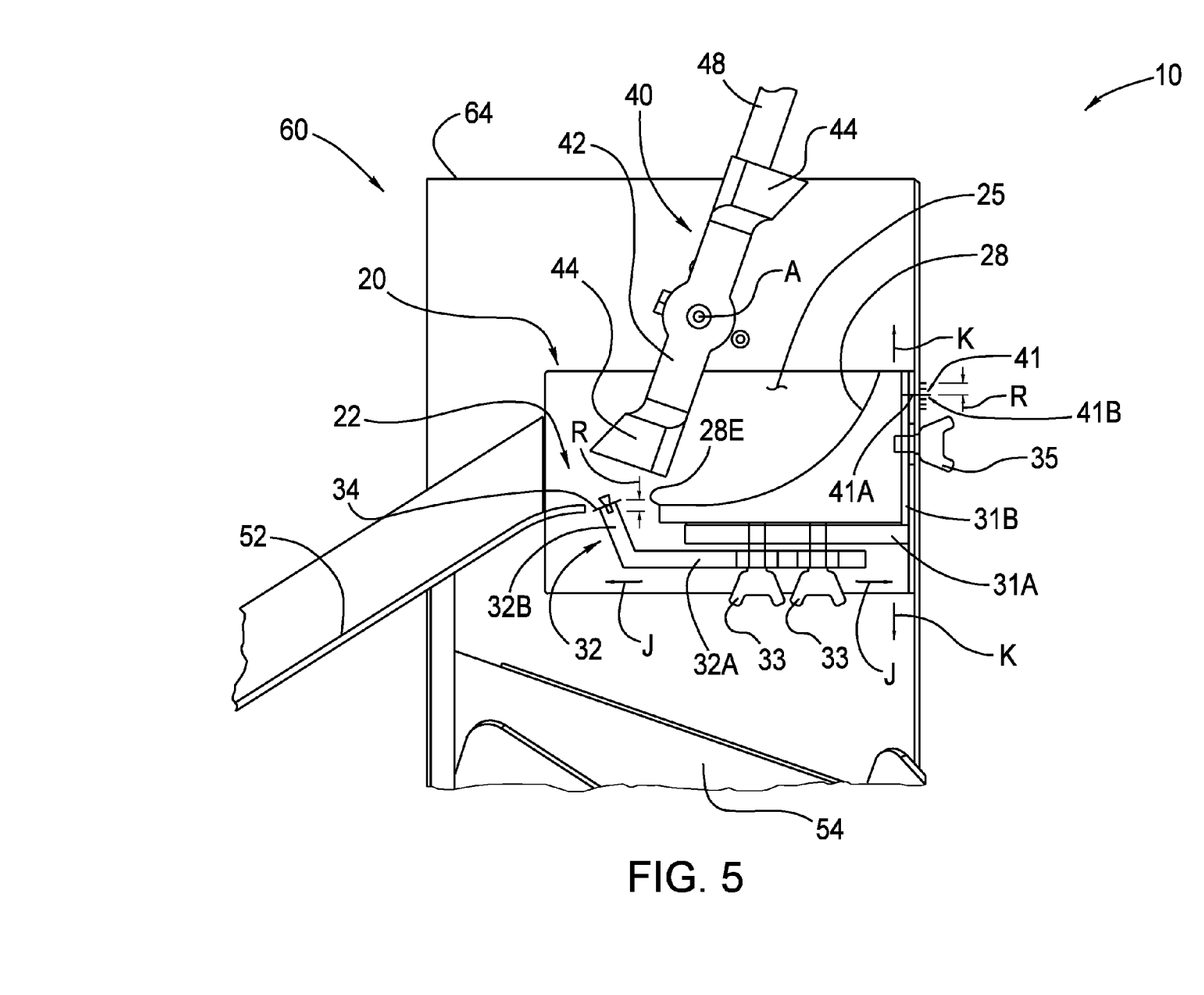
FIG. 5 illustrates a partial perspective view of the apparatus of FIG. 1.

As shown in FIGS. 1, 2 and 5, the apparatus 10 for removing the rinds from the food item 24 includes a compartment 20 defining an interior area 22 adapted to contain the food item 24. While FIGS. 1, 2 and 3 illustrate the compartment 20 as a rectangular shaped member having a side wall 25, defining the interior area 22 accessible through an opened upper surface 25A. It is contemplated that the compartment 20 may be any shape necessary to facilitate the removal of rinds from the food item 24. It should be appreciated that in one embodiment the side wall 25 may be a unitary wall and in another embodiment the side wall 25 may be partitioned or formed as multiple walls. For example, as shown in FIG. 3 the compartment may include only two side walls or the compartment can include three or more walls.

Referring now to FIGS. 1-3, side wall 25 of the compartment 20 includes a mouth or an opening (herein after referred to as an "opening") 26, which facilitates placing at least a portion of the food item 24 into and removing the food item 24 from the compartment 20. The compartment 20 may have more than one mouth or opening 26, wherein one opening is utilized to place the food item 24 into the compartment and another opening allows at least a portion of the food item (e.g. the rind or portion thereof) to exit the compartment. An opening may be utilized for more than one purpose, and more than one opening may have more than one purpose, e. g., there may be two openings that allow the exit of at least a portion of the food item 24 from the compartment 20. In one embodiment, portions of the rind removed from the food item 24 pass through the openings by force of gravity or are manually removed.

The compartment 20 may be made of any material, including, but not limited to metal, plastic, wood, ceramic, or combinations thereof. The dimensions of the compartment 20, i.e., its height, length, and width, vary from apparatus to apparatus and depend on the food item 24 that the apparatus is utilized for as well as the dimensions of the other elements of apparatus 10 for removing the rinds from the food item 24.

Figure 4:
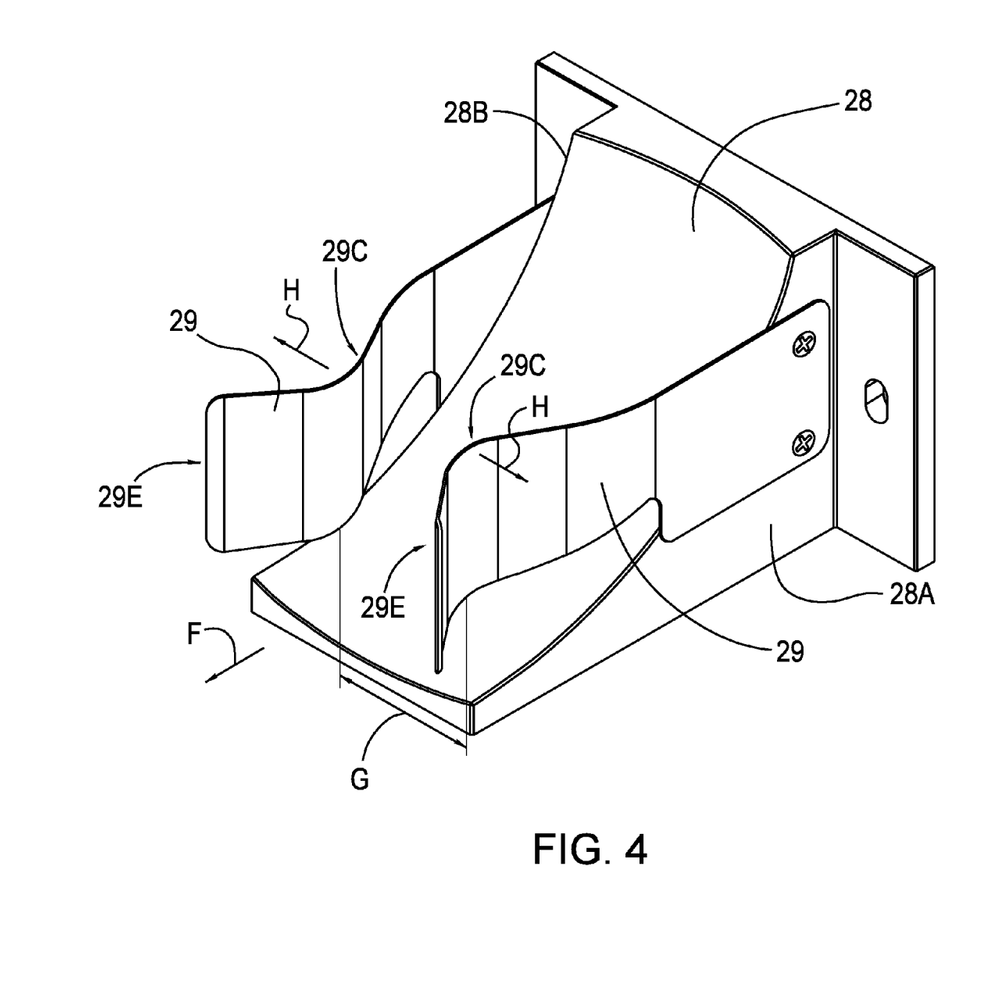
FIG. 4 illustrates a perspective view of an elevated surface having a holder extending therefrom.

As shown in FIGS. 2 and 4, in one embodiment the internal area 22 of the compartment 20 includes an elevated surface 28. The elevated surface 28 receives the food item 24 positioned thereon. In one embodiment, the elevated surface 28 is manufactured from a plastic material. In one embodiment, the elevated surface 28 is integrally formed with or coupled to a rear wall 27. The elevated surface 28 and rear wall 27 are selectively inserted in and removed from the interior area 22 of the compartment 20 to facilitate, for example, cleaning, repair or replacement. As shown in FIG. 4, a pair of curved holders 29 is removably coupled to opposing lateral sides 28A, 28B of the elevated surface 28. In one embodiment, a central portion 29C of each of the holders 29 curves inwardly towards one another forming a gap G therebetween. A distal end 29E of each of the holders 29 curves outwardly from the central portion 29C. The holders 29 and the elevated surface 28 temporarily hold the food item 24 prior to removal of the rinds. The holders 29 are manufactured from a compliant material such that when the food item 24 is pushed through the holders in the general direction defined by the arrow F, the holders deflect outwardly from one another as shown by the arrows marked H. In one embodiment the holders 29 are manufactured from a stainless steel sheet material.

While the elevated surface 28 is described as being concave, the present invention is not limited in this regard as other configurations may be employed, including but not limited to an inclined surface or surfaces where the highest point of the inclined surface or surfaces is adjacent to the rear wall 27 of the compartment 20 (as used herein, the term "adjacent" means close or next to, with or without touching), a convex surface, a flat surface, a horizontal surface and/or a surface that is shaped specifically to the contours of the food item to be worked on can also be employed without departing from the broader aspects of the present invention. Although the elevated surface 28 is shown having a pair of curved holders 29, the present invention is not limited in this regard as any number of holders of any configuration can also be employed or the holders may be eliminated, without departing from the broader aspects of the present invention.

Figure 6:
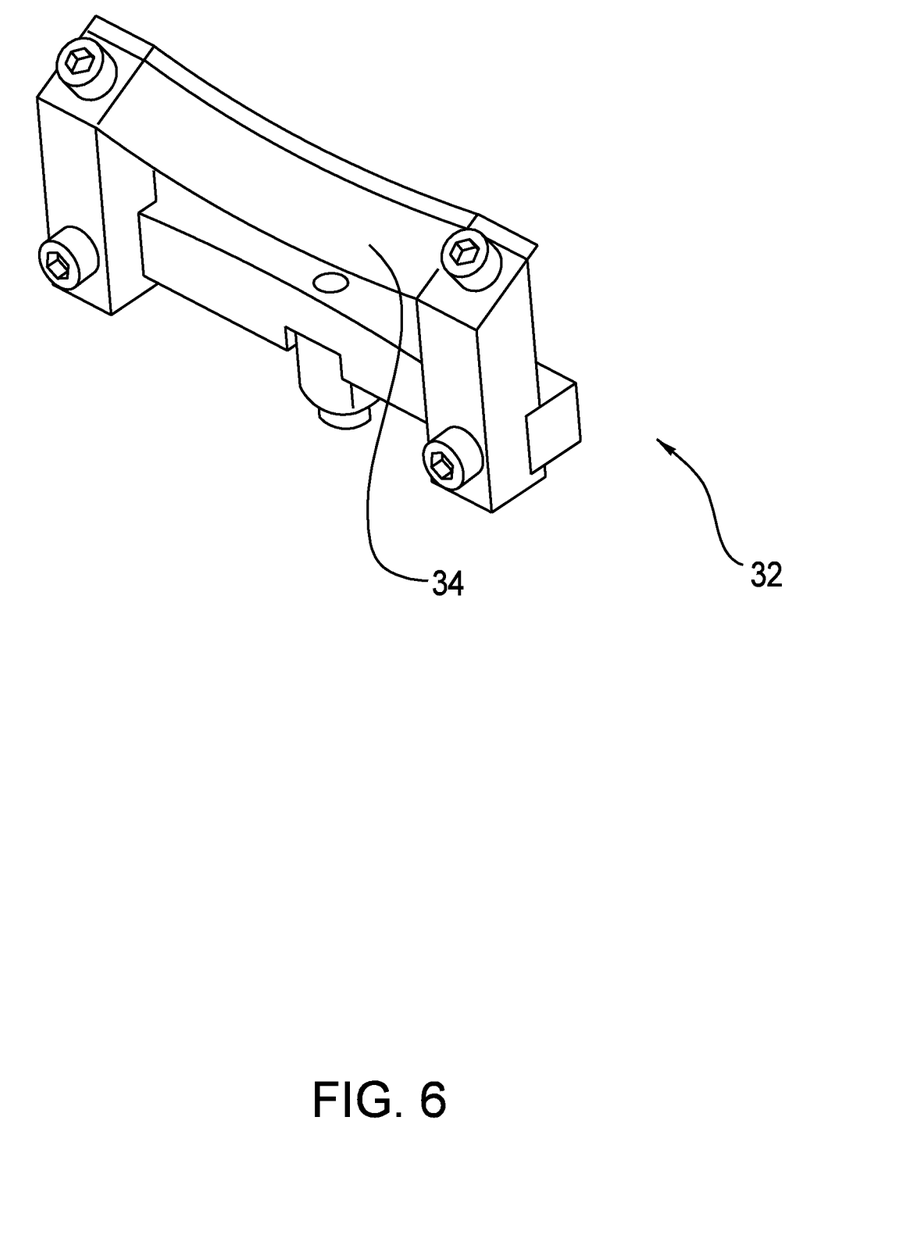
FIG. 6 illustrates a perspective view of one embodiment of a portion of a blade apparatus.

As shown in FIGS. 2 and 5, the compartment 20 also includes two mounting portions 31A, 31B positioned inside the compartment approximately perpendicular to one another. The mounting portion 31B is secured to the side wall 25 of the compartment 20. A blade assembly 32 is adjustably positioned in the compartment 20. The blade assembly 32 includes a plate portion 32A with a branch portion 32B extending therefrom. The blade assembly 32 includes a blade 34 removably secured to the branch portion 32B. As shown in FIG. 6, the blade 34 is adapted to remove a rind from the food item 24. The blade 34 may be of any type that is able to remove a rind from the food item 24. The blade 34 may be curved or straight. The blade 34 may be interchangeable. For example, a user of the apparatus 10 for removing the rinds from the food item 24 may change the blade 34 from a straight edge blade to a curved edge blade. Additionally, the blade 34 may be removable to facilitate cleaning, sharpening, or replacement. Alternatively, the blade assembly 32 may be removable from the compartment 20.

As shown in FIG. 5, the plate portion 32A is adjustably secured to the mounting portion 31A by suitable fasteners such as, for example, screws and wing-nuts 33. It should be appreciated that the blade assembly 32 is adjustable in a direction parallel to the mounting portion 31A, toward and away from the opening 26 of the compartment 20 as shown by the arrows J. In addition, the mounting portion 31B of the compartment 20 is adjustably secured to a frame 60, described below, by a suitable fastener such as, for example, a screw and a wing-nut 35. The above described configuration allows the blade 34 to be positioned adjacent to the elevated surface 28 so that when the food item 24 traverses the elevated surface 28 in the direction of arrow F (FIG. 4) the food item 24 passes over the blade 34. In one embodiment the apparatus 10 for removing the rinds from the food item 24 includes a position indicator 41 including a pointer 41A which moves over a set of reference lines 41B. The position indicator 41 provides a measurement of the position R of the blade 34 relative to a forward edge 28E of the elevated surface 28 to, in effect, assist adjustment of a depth of cut within the rind to ensure substantially all the rind is removed from the food item 24.

Referring back to FIG. 1, in one embodiment the apparatus 10 for removing the rinds from the food item 24 includes a pushing apparatus 40. At least a portion of the pushing apparatus 40 is movable to selectively engage the food item 24.

As shown in FIG. 5, in one embodiment, the pushing apparatus 40 includes an elongated portion 42 with a pushing mechanism or finger 44 (hereinafter "pushing mechanism") attached to opposing ends thereof. In this embodiment, the pushing apparatus 40, via the pushing mechanism 44, is adapted to contact at least a portion of the food item 24 and push, or otherwise move, the food item 24 to assist traversal along the elevated surface 28.

While the pushing apparatus 40 is shown with two pushing mechanisms or fingers 44 attached to the elongated portion 42, the present invention is not limited in this regard, as the pushing apparatus can employ only one pushing mechanism, more than two pushing mechanisms and/or pushing mechanisms of different sizes and pushing mechanisms offset from one another, without departing from the broader aspects of the present invention. In addition, the pushing mechanism 44 may be of any shape that is adapted to contact at least a portion of the food item 24. For example, the pushing mechanism 44 may be a square shaped block, a rectangular shaped block, a triangular shaped segment, or the like. The surfaces of pushing mechanism 44 may be straight or contoured.

In one embodiment, the pushing apparatus 40 is driven or moved by an actuator 48. Actuator 48 may be any device that when activated rotates the pushing mechanism 40 about an axis of rotation A. Actuator 48 may be, for example, a handle, a pneumatic actuator, an electric actuator, or a hand crank actuator 48.

While the hand crank 48 is described for driving the pushing apparatus 40, the present invention is not limited in this regard as any actuator means may be employed including but not limited to a motorized pneumatic actuator, a motorized electric actuator, and the like.

In one embodiment, the pushing apparatus 40 may be manufactured from more than one material. For example, the pushing mechanism 44 may be made of one material while elongated portion 42 may be made of an entirely different material. Materials including, but not limited to plastic, wood and ceramic can be utilized to manufacture one or more components of the pushing apparatus 40. The hand crank 48 may be made of one or more materials. For example, the hand crank 48 may be made of a metal and covered with a rubber or plastic casing.

The pushing apparatus 40 is positioned so at least a portion of the pushing apparatus is capable of entering the interior area 22 of the compartment 20 and contacting the food item 24 that is positioned in the interior area of the compartment. Typically, at least a portion of the pushing apparatus 40 contacts at least a portion of the food item 24 in the compartment 20. As shown in FIGS. 1 and 5, in one embodiment, the pushing apparatus 40 is positioned above the interior area 22 of the compartment 20. However, it is contemplated that the pushing apparatus can be located at any position with respect to the compartment 20, i.e., under the compartment, behind the compartment, or next to the compartment.

As shown in FIG. 2, the hand crank 48 and the pushing apparatus 40 are rotatably engaged with a rotation mechanism 50, secured to or contained by the frame 60 by suitable fasteners. In one embodiment, the rotation mechanism 50 includes ball bearings therein to facilitate the smooth assisted rotation of the hand crank. As the hand crank 48 is rotated about the axis A, at least a portion of the pushing apparatus 40 contacts at least a portion of the food item 24 present in the interior area 22 of the compartment 20 to assist traversal along the elevated surface 28 toward the blade 34.

As the food item 24 is pushed toward the blade assembly 32 by at least a portion of the pushing apparatus 40, the blade 34 contacts the food item 24 and separates the food item into two or more parts. For example, the rind can be separated from the remainder of the food item. After separation of the food item 24 into two or more parts, at least a portion of the food item 24 is received by a first surface 52 and another portion of the food item is received by a second surface 54. As shown in FIGS. 1, 2 and 5, the first surface 52 is adjacent to the opening 26 of the compartment 20 while the second surface 54 is beneath the compartment.

In one embodiment, as shown in FIGS. 1, 2 and 5, the first surface 52 and the second surface 54 may both be ramps or chutes that catch and carry portions of this food item 24 away from the blade assembly 32. However, the first surface 52 and the second surface 54 may be any type of surface that is able to receive a portion of the food item 24. For example, the first surface 52 and/or the second surface 54 include, but are not limited to, a ramp, a chute, a plate, a bowl, a pail, a tray, a conveyor belt, or the like. Moreover, it is contemplated that the first surface 52 may be different in type or size from the second surface 54.

Typically the desired portion of the food item 24 is received by the first surface 52 and the rind of the food item 24 is received by the second surface 54. However, since the compartment 20 may be configured in any manner that is adaptable for the purpose of the apparatus 10 for removing the rinds from the food item 24, in some configurations of the apparatus for removing the rinds from the food item, the desired portion of the food item 24 could be received by the second surface 54 while the rind of the food item would be received by the first surface 52.

As shown in FIGS. 1 and 2, in one embodiment, the first surface 52 may be supported by a first surface support 56 and the second surface 54 may be supported by a second surface support 58. As will be recognized by one of ordinary skill in the art, certain types of surfaces 52 and 54 will not require the surface supports 56 and 58.

In one embodiment of the apparatus 10 for removing the rinds from the food item 24 as shown in FIGS. 1 and 2, the frame 60 includes, among other things, a base 62 and a support wall 64. While FIGS. 1 and 2 illustrate the support wall 64 attached perpendicularly to the base 62, it is contemplated that the relationship between the support wall and the base may be different in various configurations of the apparatus for removing the rinds from the food item 10. For example, the support wall 64 may be diagonally attached to the base 62. In one embodiment, the base 62 is of a pan shaped configuration.

The dimensions of the base 62 and the support wall 64 are dependent on various criteria, including, but not limited to, the overall size of the apparatus 10 for removing the rinds from the food item 24, the desired use of the apparatus 10, where the apparatus will be utilized, and the dimensions of the other elements of the apparatus. The base 62 and the support wall 64 may be made of any material, including, but not limited to metal, plastic, ceramic, wood, and combinations thereof.

The support wall 64 can be stabilized by one or more support braces 66. The support brace 66 is typically adjacent to the support wall 64, and as shown in FIGS. 1 and 2, the support brace is attached to the base 62 and is adjacent to the support wall to stabilize the support wall.

While FIGS. 1 and 2 illustrate the compartment 20 and the pushing apparatus 40 mounted on the support wall 24, it is noted that neither the compartment nor the pushing apparatus is required to be mounted on, or adjacent to, the support wall. For example, the compartment 20 may be mounted on the support wall 64, while the pushing apparatus 40 may be attached to or mounted on the compartment 20. In another example, the compartment 20 may be mounted on the support wall 64, while the pushing apparatus 40 may be attached or mounted to an independent and/or separate apparatus that can be brought close to the compartment. In yet another example, the pushing apparatus 40 may be mounted on the support wall 64 while the compartment 20 is independent or separate from the support wall. While not explicitly illustrated, other configurations are possible given the disclosure and explanation herein.

Still referring to FIGS. 1 and 2, the frame 60 includes two clamps 68 attached to the base 62 for selectively securing the apparatus to a work surface. The clamps 68 allow a user to selectively position apparatus 10 on any work space of his or her choosing, and also allow the user to move the apparatus to another work space or area. While the apparatus 10 is illustrated with the two clamps 68 attached to the base 62, it is contemplated that only one clamp may be used, or more than two clamps can be used. Additionally, it is contemplated that the apparatus 10 may be manufactured and/or utilized without the clamps 68.

In use, after the apparatus 10 is secured to the work surface, the food item 24 is positioned in the compartment 20. Typically, the food item 24 is positioned on the elevated surface 28 in the interior area 22. The pushing apparatus 40 is moved by the actuator 48 which causes a portion of the pushing apparatus 40 to contact at least a portion of the food item 24, thereby pushing or moving the food item along the elevated surface 28 toward the blade assembly 32. While being pushed, at least a portion of the food item 24 e.g., the rind, comes into contact with the blade 34, and is removed from the food item.

It is envisioned that the size of any or all of the elements may be altered to fit certain fruits or other food products.

Although the present invention has been disclosed and described with reference to certain embodiments thereof, it should be noted that other variations and modifications may be made within the true scope of the invention.

What is claimed is:

1. An apparatus for removing a rind of a food item, said apparatus comprising:
   a frame having a base;
   a compartment carried by said frame defining an interior area adapted to receive said food item;

said compartment having at least one opening enabling said food item to be received within said compartment interior;

a stationary blade assembly having an exposed blade disposed in proximity to said at least one opening of said compartment;

wherein said compartment is adjustable relative to said blade assembly;

an elevated concave surface for engaging and directing a food item placed thereon towards said blade assembly;

a pushing mechanism that is separate from the concave surface, wherein at least a portion of said pushing apparatus is movable to engage said food item and wherein the pushing mechanism is adapted to contact at least a portion of the food item and push said food item from said compartment interior along said elevated concave surface into contact with said exposed blade and continuing moving said food item past said exposed blade enabling said food item to exit said compartment interior;

an actuator for driving said pushing apparatus to contact at least a portion of said food item in said compartment and to move said food item from said interior area into contact with said blade assembly such that at least a rind of said food item is removed by said blade assembly;

a food item receiver horizontally offset from said stationary blade assembly for receiving said food item devoid of rind; and a rind receiver carried by said frame at a plane lower than said food item receiver for receiving said rind.

2. A method for removing a rind from a food item, the method comprising:

positioning a food item in a compartment of an apparatus, said compartment defining an interior area adapted to receive said food item, having at least one opening;

providing a stationary blade assembly having an exposed blade;

providing an elevated concave surface for engaging and directing a food item place thereon towards said blade assembly;

actuating a pushing apparatus that is separate from the concave surface, to contact at least a portion of the food item and push said food item out of said interior area via said concave surface into contact with said blade assembly and continuing activation of said pushing apparatus such that said blade assembly removes a rind from said food item;

utilizing said pushing apparatus to continuously exert pressure onto said food item as it engages said blade forcing said food item to engage said blade assembly with sufficient force enabling said blade assembly to remove rind from said food item and also exerting pressure after the rind is remove from a particular section of said food item so that said section of said food item may exit both the interior of said compartment and the blade assembly thereby presenting a new section of said food item to said blade assembly for removal of its corresponding rind portion;

said pushing apparatus presenting pressure onto said food item enabling the rind of said food item to be completely removed and subsequently forcing said entire food item out of said compartment interior and beyond the profile of said blade assembly presenting said food item devoid of rind to a food item collection area adjacent to said opening;

providing a second surface beneath said compartment vertically offset from said food collection area; and collecting said rind via said second surface.

3. The apparatus of claim 1 further including a food item holder received within said interior of said compartment; said food item holder including a pair of offset arms for restraining the lateral movement of said food item and said offset arms defining an opening at a distal end enabling said food item to exit from the restraint of said offset arms in a forward direction for engagement with said blade assembly.

\* \* \* \* \*